Figure 1:
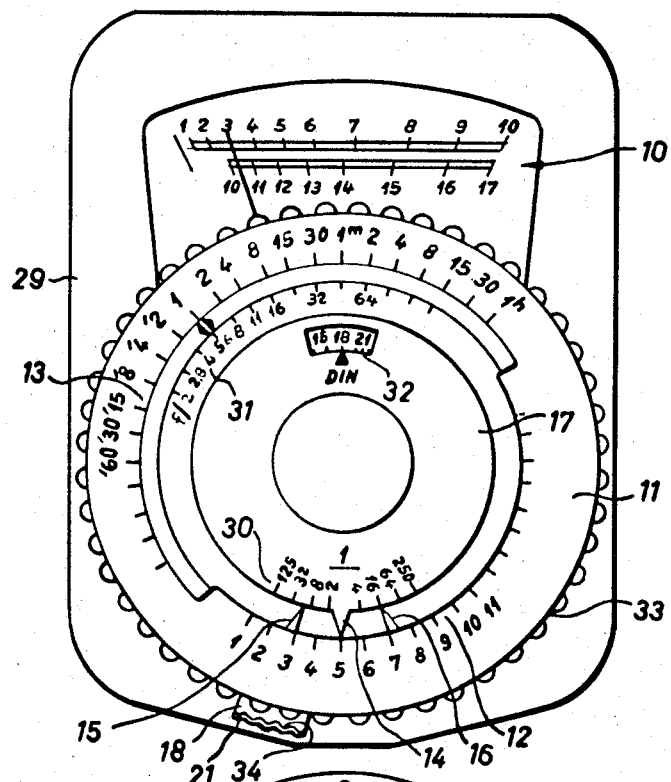

Dec. 3, 1968 C. KOCH 3,414,191

EXPOSURE METER FOR PHOTOGRAPHIC PURPOSES

Filed Oct. 7, 1965

Inventor
Carl Koch
By Watson, Cole, Grindle & Watson
Attys.

United States Patent Office 3,414,191
Patented Dec. 3, 1968

3,414,191
EXPOSURE METER FOR PHOTOGRAPHIC
PURPOSES
Carl Koch, Vordersteig 2, Schaffhausen, Switzerland
Filed Oct. 7, 1965, Ser. No. 493,702
Claims priority, application Germany, July 28, 1965,
K 56,746
6 Claims. (Cl. 235—64.7)

This invention relates to an exposure meter for photographic purposes, particularly for use by professional photographers.

The exposure meter, as known, has been equipped with a brightness value scale and three associated indicators, movable in relation to the brightness value scale, two of these indicators being limiting value indicators for the darkest and brightest part of the picture and one being a mean value indicator which is coupled with the limiting value indicators for the automatic and mechanical formation of the mean value and which supplies the exposure value serving for the determination of the time and aperture data.

In the case of exposure meters which have been known so far and of the type just described, the brightness value scale has been developed as a fixed means and each of the two limiting value indicators has been developed individually as adjustable from the outside through an associated operating element. The position of the mean value indicators will then result automatically after setting of the two limiting value indicators. This design of the exposure meter has disadvantages for professional photographers who work mostly with artificial light and fill-in lights, insofar as it will be necessary to make two adjustments in each case, even if the brightness range of the subject is intentionally selected the same through the proper selection and placing of the illumination, namely in such a manner, that for a certain photographic material the lighting contrast between the dark and the bright sections will be at an optimum. In the case of the known exposure meters of the type mentioned just above, it is not possible to adjust the mean value indicators in relation to the brightness value scale directly and in that manner to keep the brightness value range, enclosed between the limiting value indicators, constant. Nor is it possible to make a relative shifting of the brightness value scale in relation to the indicators, concerning one another, in the case of any fixed selected adjustment of the indicators, in order to shift, as a result of that, the range fixed between the limiting value indicators along the brightness value scale.

As a result of the invention, an exposure meter is supposed to be created which does not have the described disadvantages but which, in case of need, will still permit the operator to make the same type of measurements as the known exposure meters which have been mentioned and, generally speaking, makes possible any kind of measurement occurring in practice.

The exposure meter according to this invention, which will solve this problem, has been essentially characterized by means which make possible, at any desired firm selection of an adjustment of the indicators in relation to one another, a movement of the three indicators together in relation to the brightness value scale and which by coupling means makes possible a firm holding on one of the limiting value indicators in regard to the brightness value scale, while the second limiting value indicator and the mean value indicator will be adjustable in relation to one another and in relation to the brightness value scale and the first mentioned limiting value indicator. In a preferred embodiment, the mean value indicator is fixed and the two limiting value indicators, as well as the brightness value scale, are arranged movably, and only one of the limiting value indicators will be in contact with an operating element for the positive adjustment of the two limiting value indicators. Furthermore, the above mentioned operating element can be coupled with a bearer of the brightness value scale, which is operable from the outside in order to fix one of the limiting value indicators in relation to the scale, whenever the latter is supposed to be adjusted in relation to the second limiting value indicator, while the setting of the first limiting value indicator remains unchanged.

According to a particularly simple and advantageous embodiment of the invention, the bearer of the brightness value scale has a ribbed or grooved edge, while the operating element for adjusting one of the limiting value indicators has an elastically movable pressure lobe, which can be brought to mesh through a pressure or force of the finger with the ribbed edge, as a result of which the operating element can then be moved together with the scale as a unit.

Figure 2:
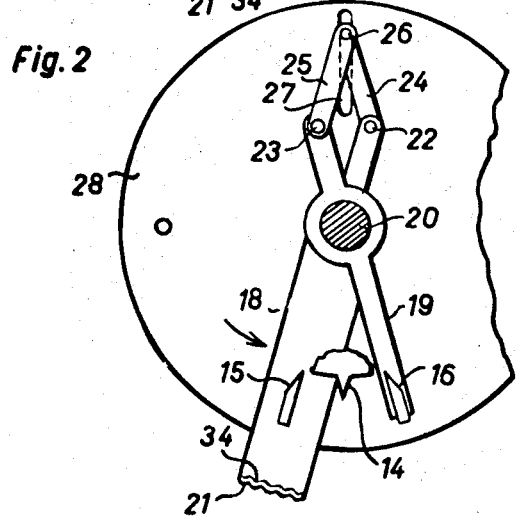
Figure 3:
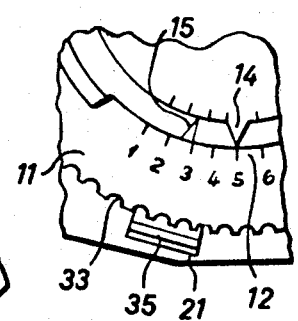

Further objects and details of the invention will appear from the following description when considered in connection with the accompanying drawing in which two embodiments of an exposure meter, according to the invention, have been shown purely by way of example:

FIGURE 1 is a plan view of the first example of an embodiment of an exposure meter, FIGURE 2 is a plan view showing a number of inside parts of the exposure meter, namely the mechanism for adjusting and coupling of the limiting value indicators, and FIGURE 3 is a plan view of a detail of a second embodiment by way of an example of the exposure meter.

The exposure meter according to FIGURES 1 and 2 has an electric indicator instrument 10 which indicates in a known manner the brightness found or induced through a photoelectric cell or a photoresistance element. For converting the brightness values measured through instrument 10 into data regarding the aperture and exposure time which must be set on the camera, there are several circular scales and associated reference points which will be explained in the following paragraphs.

An outside annular scale bearer 11 is provided with a linearly divided brightness value scale 12 and a logarithmic exposure time scale 13. Three indicators 14, 15 and 16 are associated with the first named scale 12. The middle indicator 14 is mounted on a fixed inside disc 17 and it is therefore immovable. The other two indicators 15 and 16 are each firmly connected with bearing arms 18 and 19 respectively (FIGURE 2), which are mounted to swing or rotate on a fixed middle axis 20. One bearer arm 18 is extended toward the outside, beyond the edge of the periphery of the scale bearer or disc 11 and has been provided with a pressure or actuator lobe 21, angled off on top and which serves as an operating element for shifting the indicator 15. The two arms 18 and 19 are connected with the governors or links 24 and 25 through a hinge pin 22 and 23 respectively, said governors on their part being coupled one with the other by means of a peg or pin 26. The peg 26 meshes and slides in a guide slot 27, which is provided in a base plate 28 extending radially relative to the axis 20. The base plate 28 is secured nonrotatably on the housing plate 29 of the exposure meter, and it carries, by means of the axis 20, the already mentioned and likewise nonrotatable inside disc 17 with the indicator 14. By means of the governors or links 24 and 25 and by means of the guide slot 27, the two indicators 15 and 16 are mechanically coupled with one another and with the fixed indicator 14 in such a manner that when shifting one movable indicator 15, the other movable indicator 16 will execute exactly the same movement in the opposing direction relating to the fixed indicator 14. In other words, at each position of the two movable indicators 15 and 16, the fixed indicator 14 will always be located in the middle between the indicators 15 and 16.

If the two movable indicators 15 and 16 show two limiting values or extreme values on the brightness value scale 12, then the fixed indicator 14 will always automatically show the mean value of the two limiting values. Thus, the indicators 15 and 16 are limiting value indicators, while the indicator 14 is a mean value indicator.

Graduations and proportionality factors 30 are indicated on the inside disc 17, in relation to which one or the other of the limiting value indicators 15 or 16 can be adjusted. The proportionality factor facing the pertinent limiting value indicator gives the brightness range, which is encompassed by the area of the brightness value scale 12 enclosed between the two limiting value indicators 15 and 16. The exposure meter is also equipped in a known manner with an aperture scale 31 and a scale 32 with proper reference points for adjustment for the sensitivity of the photographic negative material used.

The scale bearer 11 on its outside has a ribbed or scalloped peripheral edge 33 which makes possible an easy turning of the scale bearer 11. The pressure lobe 21 for operating the limiting value indicators 15 and 16 is located at the relatively short distance radially outside of the peripheral edge 33 of the scale bearer 11. The lobe 21 is preferably made resilient and it may be pressed from the outside against the peripheral edge 33 by pressure of the finger and counter to its own elasticity for the purpose of coupling one of the limiting value indicators 15 with the scale bearer 11 so that both can be turned simultaneously one with the other. In order to prevent an unintentional slipping of the lobe 21 with regard to the scale bearer 11, said lobe 21 is provided with a few grooves 34, preferably on the side facing the peripheral edge 33 and one or several ribs of the peripheral edge 33 can be brought to mesh with those grooves, whenever the lobe 21 is pressed against the peripheral edge 33. In the embodiment according to FIGURES 1 and 2, the lobe 21 for formation of the grooves 34 has been waved.

In the second embodiment of the exposure meter shown only partially in FIGURE 3, the lobe 21, serving for the operation of the limiting value indicator 15, has an elastically resilient rubber buffer, 35 on its side facing the scale bearer 11. The lobe 21 itself is again made elastically in such a manner that it can be moved against the peripheral edge 33 of the scale bearer 11 by means of the pressure of a finger, in order to bring the rubber buffer 35 into direct engagement with the ribs and the grooves of the peripheral edge 33 and in order to couple, as a result thereof, the limiting value indicator 15 with the scale bearer 11.

Each of the described embodiments by way of example of the new exposure meter, can be used in four different ways. In the case of the first type of use, the two limiting value indicators 15 and 16 are set from the beginning at a certain distance one from the other with the aid of the operating lobe 21 and with regard to the scale 30, and they are set corresponding to the optimum or the maximum permissible brightness that can be handled by or is responsive to the photographic negative material used. According to the illustration in FIGURE 1, this set brightness contrast amounts to 1:16. The lighting of the subject is then selected in such a manner and, if need be, changed in such a manner, that the brightness value of the brightest part of the picture found with the exposure meter would be at about the limiting value indicator 16 and the brightness value of the darkest part would be about at the limiting value indicator 15. In practice, one will proceed, for example, in the following manner: First of all the brightness value of the brightest part of the picture is measured with the instrument 10 and then the scale bearer 11 is turned in such a manner that on the scale 12 the measured value, for example "7," will face the limiting value indicator 16. Thereafter, one can read at the other limiting value indicator 15 on the scale 12 that the brightness value of the darkest part of the picture must be "3." By adding or taking away of sources of illumination or fill-in lights, the brightness of the darker part of the picture is then arranged in such a manner, that the control measurement with the instrument 10 will result in the brightness value "3." Finally, one can find without change of the adjustment of the scale bearer 11, the correct exposure time and aperture for the photographic picture by means of the scales 13 and 31, whereby the mean value from the two limiting values "7" and "3" will enter into the calculation automatically as the exposure value. The mean value "5" of the brightness, which can be read along the indicator 14, does not need to be known at the same time.

The second manner of use of the exposure meter will be used preferably, whenever the lighting of the subject cannot be changed and cannot be adapted to the optimum brightness contrast. In this case one will proceed, for example, as follows. First of all the darkest section of the picture of the subject is measured with the instrument 10. The value is for example "3," and is retained through the limiting value indicator 15 on the scale 12. Thereafter, one will measure the brightness of the brightest part of the picture by means of the instrument 10. Assuming that the result would show the brightness value as "9," then it will now be necessary to set the second limiting value indicator 16 in relation to the scale 12 to the value "9," without the setting of the first limiting value indicator 16 changing in relation to the scale 12. For this purpose, the operating lobe 21 will be pressed by a pressure of the finger against the peripheral edge 33 of the scale bearer 11 and, as a result, it will be coupled with the scale bearer 11. Subsequently, the scale bearer 11 is turned, while taking along at the same time the operating lobe 21, in such a manner that the brightness value "9" of the scale 12 will come to rest opposite the limiting value indicator 16. The other limiting value indicator 15 will then still be at the brightness value "3." Without any further adjustment of the scale 12, one can now read from scales 13 and 31 the correct exposure time and aperture for the picture to be photographed. In this case too, the mean value will enter automatically from the two limiting values "9" and "3" into the calculation as the exposure value. This mean value "6" could be read along the mean value indicator 14, but one would not have to know it.

In the case of the third procedure of use of the described exposure meter, which is particularly pertinent for a quick method of operation, the extreme values of the brightness of the subject are disregarded. With the help of the instrument 10, the average brightness of the subject will be measured in a known manner, or else one will measure the brightness of a part of the picture which has approximately average lighting, or else of a gray cardboard which is customary for this type of measurement. The brightness value found, for instance, "5," is used directly as the exposure value and it will be opposed through the proper turn of the scale bearer 11 to the middle value indicator 14, whereupon one can read off from the scales 13 and 31 the exposure time and the aperture for the photographic picture to be taken. The limiting value indicators 15 and 16 are not used in the case of this type of use of the exposure meter, their position being entirely irrelevant, since in this type of measurement the brightness contrast is not included in the measurement process.

In the case of the fourth type of use of the exposure meter, first of all, just as in the case of the first type of use, the maximum permissible brightness contrast for the negative material used will be set by means of one of the limiting value indicators 15 or 16 in relation to the scale 30. Then one will measure, just as in the case of the third type of use, a mean brightness of the subject to be photographed and one then sets the mean brightness value found on scale 12 opposite indicator 14. Now the two limiting value indicators 15 and 16 will show the limiting brightness values on the scale, which one must not fall short of nor exceed if one wants to have a good result in the picture, which fact can be controlled by means of the instrument 10 by measurement of the brightness of the darkest and the brightest part of the picture. If the actually measured contrast will remain inside of the limits determined by the indicators 15 and 16, the picture can be taken on the basis of the mean brightness value set along indicator 14, which will enter as an exposure value into the calculation of the time and aperture data. If need be, one can, however, first make a correction of the mean brightness or of the exposure value to be used, if the actually found limiting values of the brightness do not lie within the area limited by the limiting value indicators 15 and 16, or if they are quite unsymmetrical in relation to the mean value indicator 14. In the case of this type of use of the exposure meter, one will start out from a mean brightness value as in the case of the third type of measurement, but in contrast to this third type of measurement, the brightness contrast is not disregarded.

By means of the present invention it has become possible, in the case of all four methods of use of the exposure meter described, to limit the necessary manipulations to a minimum and to register the values resulting from up to three measurements (lower and upper limiting value and the mean value) on the instrument itself, until it is used. In the case of the known exposure meters with two limiting value indicators and one automatically averaging mean value indicator, the handling, at least in the case of one of the different methods of use, is regularly considerably more complicated and circumstantial. In the case of the known instruments, a relative adjustment of the brightness value scale in relation to the mean value indicator or vice versa is not possible without a change of the brightest contrast limited by the limiting value indicators. With the ordinary exposure meters without adjustable limiting value indicators, no registration at all can be made of the result of a measurement until after a second measurement has been made, and, for this reason, only the above mentioned third type of measurement is possible in a convenient manner.

In variations of the embodiment now shown here and of the new exposure meter, other than the means described for coupling of one of the limiting value indicators 15 with the scale bearer 11 may be present. Thus, it would be possible, for example, to attach in a suitable place in the center of the scale disc, a pressure button, upon the operation of which the desired coupling between the one limiting value indicator and the bearer 11 of the brightness value scale 12 will become effective.

It is furthermore clear that the mechanism for the automatic formation of the mean value does not necessarily have to be the design shown in FIGURE 2 in every instance since other solutions for the same purpose have already been known.

The remaining design of the exposure meter may naturally have all the variations of construction of exposure meters known heretofore.

I claim:

1. Exposure meter for photographic purposes comprising a brightness value scale and three associated indicators movable in relation to the brightness value scale, two of the indicators are limiting value indicators and one is a mean value indicator, means to couple the limiting value indicators for the automatic and mechanical formation of the mean value and which will supply the exposure value and serving for the determination of the time and aperture data by means of which, at any selected fixed setting of the indicators in relation to one another, a relative movement of the three indicators is possible in relation to the brightness value scale and by the coupling means for arresting the limiting value indicators in relation to the brightness value scale, while the second limiting value scale and the mean value scale are adjustable in relation to one another and in relation to the brightness value scale and the first-mentioned limiting value indicator.

2. Exposure meter according to claim 1, in which the mean value indicator is fixed and the two limiting value indicators as well as the brightness value scale are movably arranged, and in which an operating element is provided with one of the limiting value indicators connected with the operating element for the forced shifting of the two limiting value indicators, said operating element being capable of being coupled with a carrier for the brightness scale, and said operating element being operable from outside for fixing one of the limiting value indicators in relation to the brightnesss value scale whenever the latter is supposed to be adjusted in relation to the second limiting value indicator, while the adjustment of the first limiting value indicator remains unchanged.

3. Exposure meter according to claim 1, in which the mean value indicator is fixed and the two limiting value indicators as well as the brightness value scale are movably arranged, and in which an operating element is provided with one of the limiting value indicators connected with the operating element for the forced shifting of the two limiting value indicators, said operating elements being capable of being coupled with a carrier for the brightness scale, and said operating element being operable from outside for fixing one of the limiting value indicators in relation to the brightness value scale whenever the latter is supposed to be adjusted in relation to the second limiting value indicator, while the adjustment of the first limiting value indicator remains unchanged, the carrier for the brightness value scale having a ribbed edge, and the operating element being in the form of an elastically movable pressure lobe which can be brought to mesh with the ribbed edge of the brightness value scale carrier by applying a pressure of a finger thereon.

4. Exposure meter according to claim 1, in which the mean value indicator is fixed and the two limiting value indicators as well as the brightness value scale are movably arranged, and in which an operating element is provided with one of the limiting value indicators connected with the operating element for the forced shifting of the two limiting value indicators, said operating element being capable of being coupled with a carrier for the brightness scale, and said operating element being operable from outside for fixing one of the limiting value indicators in relation to the brightness value scale whenever the latter is supposed to be adjusted in relation to the second limiting value indicator, while the adjustment of the first limiting value indicator remains unchanged, the carrier for the brightness value scale having a ribbed edge, and the operating element being in the form of an elastically movable pressure lobe which can be brought to mesh with the ribbed edge of the brightness value scale carrier by applying a pressure of a finger thereon, the ribbed edge of the carrier having grooves therein which can be brought to mesh with the pressure lobe.

5. Exposure meter according to claim 1, in which the mean value indicator is fixed and the two limiting value indicators as well as the brightness value scale are movably arranged, and in which an operating element is provided with one of the limiting indicators connected with the operating element for the forced shifting of the two limiting value indicators, said operating element being capable of being coupled with a carrier for the brightness scale, and said operating element being operable from outside for fixing one of the limiting value indicators in relation to the brightness value scale whenever the latter is supposed to be adjusted in relation to the second limiting value indicator, while the adjustment of the first limiting value indicator remains unchanged, the carrier for the brightness value scale having a ribbed edge, and the operating element being in the form of an elastically movable pressure lobe which can be brought to mesh with the ribbed edge of the brightness value scale carrier by applying a pressure of a finger thereon, and the pressure lobe on the side facing the edge of the carrier having an elastically yielding rubber buffer which can be brought to mesh with the edge of the scale carrier.

6. Exposure meter according to claim 1, in which the mean value indicator is fixed and the two limiting value indicators as well as the brightness value scale are movably arranged, and in which an operating element is provided with one of the limiting value indicators connected with the operating element for the forced shifting of the two limiting value indicators, said operating element being capable of being coupled with a carrier for the brightness scale, and said operating element being operable from outside for fixing one of the limiting value indicators in relation to the brightness value scale whenever the latter is supposed to be adjusted in relation to the second limiting value indicator, while the adjustment of the first limiting value indicator remains unchanged, the carrier for the brightness value scale having a grooved edge and the operating element being in the form of an elastically movable pressure lobe which can be brought to mesh with the grooved edge of the brightness value scale carrier by applying a pressure of a finger thereon.

References Cited

UNITED STATES PATENTS

| | | | |
|---|---|---|---|
| 2,987,917 | 6/1961 | Hevener | 235—61 X |
| 3,069,080 | 12/1962 | Uchihira | 235—64.7 |
| 3,199,776 | 8/1965 | Koch | 235—64.7 |

RICHARD B. WILKINSON, *Primary Examiner.*

S. A. WAL, *Assistant Examiner.*